US012516718B2

(12) United States Patent
Fiegener

(10) Patent No.: US 12,516,718 B2
(45) Date of Patent: Jan. 6, 2026

(54) DIAL DRIVE FIT SYSTEM

(71) Applicant: Tool Manufacturing, Inc., Marblehead, MA (US)

(72) Inventor: John D. Fiegener, Marblehead, MA (US)

(73) Assignee: Tool Manufacturing, Inc., Marblehead, MA (US)

( * ) Notice: Subject to any disclaimer, the term of this patent is extended or adjusted under 35 U.S.C. 154(b) by 0 days.

(21) Appl. No.: 18/429,332

(22) Filed: Jan. 31, 2024

(65) Prior Publication Data

US 2025/0043853 A1 Feb. 6, 2025

Related U.S. Application Data

(60) Provisional application No. 63/517,279, filed on Aug. 2, 2023.

(51) Int. Cl.
*F16H 19/06* (2006.01)

(52) U.S. Cl.
CPC .................................... *F16H 19/06* (2013.01)

(58) Field of Classification Search
CPC ....... F16H 19/06; A43C 11/165; A43C 11/16; A43C 11/00; A43C 7/00; A43C 11/20; A43C 1/00; Y10T 24/2183; A42B 3/08; A42B 3/085
See application file for complete search history.

(56) References Cited

U.S. PATENT DOCUMENTS

| | | | | |
|---|---|---|---|---|
| 7,694,354 | B2 * | 4/2010 | Philpott | A42B 3/08 2/416 |
| 8,381,362 | B2 * | 2/2013 | Hammerslag | A43C 1/00 36/50.5 |
| 9,622,544 | B2 * | 4/2017 | Chen | A43C 7/02 |
| 10,051,920 | B2 * | 8/2018 | Chen | A43C 1/00 |
| 10,076,160 | B2 * | 9/2018 | Burns | A44B 11/065 |
| 10,123,589 | B2 * | 11/2018 | Soderberg | A63B 71/0622 |
| 10,413,019 | B2 * | 9/2019 | Soderberg | A43C 11/165 |
| 10,463,102 | B2 * | 11/2019 | Dyer | A43C 11/20 |
| 10,656,670 | B2 * | 5/2020 | Hu | A45F 5/1516 |
| 10,660,404 | B2 * | 5/2020 | Chen | A43C 7/00 |
| 10,856,620 | B2 * | 12/2020 | Huang | A43C 11/20 |
| 2015/0191326 | A1 * | 7/2015 | Hall | A43C 11/165 242/396.4 |
| 2019/0174869 | A1 * | 6/2019 | Wang | B65H 75/26 |

* cited by examiner

*Primary Examiner* — Jack W Lavinder
*Assistant Examiner* — Louis A Mercado
(74) *Attorney, Agent, or Firm* — Coffield Heedy Kilgore PLLC; William G. Heedy

(57) ABSTRACT

A dial drive fit system includes a dial handle and dial base containing a plurality of clicker arms capable of rotating a dial base axle in a clockwise or counterclockwise rotation. The dial drive fit system utilizes a dial with flexible arms that permit winding/unwinding of a spool when a user rotates the dial handle but prevents rotation when the dial handle is not actively rotated. The dial base axle is functionally coupled with the spool configured to receive and store a filament coiled around the spool. The dial drive fit system may be used with helmets, shoes, knee braces, and any item meant to be secured or requiring adjustable tightening.

20 Claims, 15 Drawing Sheets

DIAL DRIVE FIT SYSTEM

REFERENCE TO RELATED APPLICATION

This application claims priority to U.S. Provisional Patent Application Ser. No. 63/517,279 filed on Aug. 2, 2023, entitled "Dial Drive Fit System", the disclosure and drawings of which are hereby incorporated herein in their entirety by reference.

FIELD OF THE INVENTION

This invention relates to a dial drive fit system and, more particularly, to a dial drive fit system for use with helmets, shoes, gloves, knee braces, and any item meant to be secured to the body or requiring adjustable tightening.

A dial drive fit system may utilize a dial with flexible arms for adjustably fitting an article according to a user's preferences or to meet a required tightening of the article for functional use.

BACKGROUND OF THE INVENTION

Helmets, shoes, gloves, knee braces, and other items meant to be secured to a body are often attached via a fixed or adjustable tightening mechanism. Similarly, other items may often need to be compressed or affixed to materials via a fixed or adjustable tightening mechanism, where, for example, luggage may be compressed to reduce volumetric dimensions or cargo items may need to be secured to a vehicle via a cable system threaded over or around the cargo item.

Such fixed tightening mechanisms have a limited scope of use given that a user may not adjust the fit of an article according to varying conditions and/or needs. Similarly, adjustable tightening mechanisms require complex multi-component mechanisms to facilitate consistent tightening/loosening of an item and to ensure tension is maintained after tightening/loosening is completed.

Therefore, there exists a need for a simple, adjustable fit system that provides for an even, consistent tightening and loosening mechanism that ensures a set tension is maintained after tightening and/or loosening is completed.

SUMMARY OF THE INVENTION

In accordance with one form of this invention, there is provided a dial drive system including a dial including an upper surface and a lower surface, wherein a plurality of dial arms is located on the lower surface; a dial base and a spool, the spool being rotatably mounted to the dial base and configured to receive a filament to be tightened around the spool; a plurality of dial base teeth located on the interior surface of the dial base, wherein a dial base slot is positioned between adjacent ones of the plurality of dial base teeth; wherein rotation of the spool in a first direction causes the filament to wind around the spool and rotation of the spool in a second direction causes the filament to unwind from around the spool; a clicker assembly including a first plurality of clicker arms and a second plurality of clicker arms; the first and second pluralities of clicker arms each including at least one clicker arm tine, wherein each clicker arm tine forms a tine point including a sloped tine surface and a non-sloped tine surface; the first plurality of clicker arms and the second plurality of clicker arms each being sized and configured to deform when the non-sloped tine surface is forcibly contacted with one of the plurality of dial base teeth; wherein rotation of the dial in a first direction causes each of the plurality of dial arms to engage with and deform a corresponding one of the first plurality of clicker arms, disengaging the sloped tine surface of the clicker arm tines of the first plurality of clicker arms from the dial base and permitting the dial base to rotate the spool in a first direction and wind or unwind the filament; and wherein rotation of the dial in a second direction causes each of the plurality of dial arms to engage with and deform a corresponding one of the second plurality of clicker arms, disengaging the sloped tine surface of the clicker arm tines of the second plurality of clicker arms from the dial base and permitting the dial base to rotate the spool in a second direction and wind or unwind the filament.

In accordance with another form of this invention, there is provided a dial drive system including a dial including an upper surface and a lower surface, wherein a plurality of dial arms is located on the lower surface; a dial base and a spool, the spool being rotatably mounted to the dial base and configured to receive a filament to be tightened around the spool; a plurality of dial base teeth located on the interior surface of the dial base, wherein a dial base slot is positioned between adjacent ones of the plurality of dial base teeth; wherein rotation of the spool in a first direction causes the filament to wind around the spool and rotation of the spool in a second direction causes the filament to unwind from around the spool; a clicker assembly including a first clicker set and a second clicker set; the first clicker set and the second clicker set each forming a first clicker arm and a second clicker arm; the first and second clicker arms of the first clicker set and the first and second clicker arms of the second clicker set each including at least one clicker arm tine, wherein each clicker arm tine forms a tine point including a sloped tine surface and a non-sloped tine surface; the first and second clicker arms of the first clicker set and the first and second clicker arms of the second clicker set each being sized and configured to deform when the non-sloped tine surface is forcibly contacted with one of the plurality of dial base teeth; wherein rotation of the dial in a first direction causes each of the plurality of dial arms to engage with and deform a corresponding one of the first and second clicker arms of the first clicker set, disengaging the sloped tine surface of the clicker arm tines of the first clicker set from the dial base and permitting the dial base to rotate the spool in a first direction and wind or unwind the filament; and wherein rotation of the dial in a second direction causes each of the plurality of dial arms to engage with and deform a corresponding one of the first and second clicker arms of the second clicker set, disengaging the sloped tine surface of the clicker arm tines of the second clicker set from the dial base and permitting the dial base to rotate the spool in a second direction and wind or unwind the filament.

In accordance with another form of this invention, there is provided a dial drive system including a dial including an upper surface and a lower surface, wherein a plurality of dial arms is located on the lower surface; a dial base and a spool, the spool being rotatably mounted to the dial base and configured to receive a filament to be tightened around the spool; a plurality of dial base teeth located on the interior surface of the dial base, wherein a dial base slot is positioned between adjacent ones of the plurality of dial base teeth; wherein rotation of the spool in a first direction causes the filament to wind around the spool and rotation of the spool in a second direction causes the filament to unwind from around the spool; a clicker assembly including a first multi-tooth ring and a second multi-tooth ring; the first multi-tooth ring and a second multi-tooth ring each forming a plurality of clicker arms; the plurality of clicker arms of the first multi-tooth ring and the plurality of clicker arms of the multi-tooth ring each including at least one clicker arm tine, wherein each clicker arm tine forms a tine point including a sloped tine surface and a non-sloped tine surface; the plurality of clicker arms of the first multi-tooth ring and the plurality of clicker arms of the second multi-tooth ring each being sized and configured to deform when the non-sloped tine surface is forcibly contacted with one of the plurality of dial base teeth; wherein rotation of the dial in a first direction causes each of the plurality of dial arms to engage with and deform a corresponding one of the plurality of clicker arms of the first multi-tooth ring, disengaging the sloped tine surface of the clicker arm tines of the first multi-tooth ring from the dial base and permitting the dial base to rotate the spool in a first direction and wind or unwind the filament; and wherein rotation of the dial in a second direction causes each of the plurality of dial arms to engage with and deform a corresponding one of the plurality of clicker arms of the second multi-tooth ring, disengaging the sloped tine surface of the clicker arm tines of the second multi-tooth ring from the dial base and permitting the dial base to rotate the spool in a second direction and wind or unwind the filament.

BRIEF DESCRIPTION OF THE DRAWINGS

For a fuller understanding of the nature of the present invention, reference should be made to the following detailed description, taken in conjunction with the accompanying drawings in which.

Like reference numerals refer to like reference parts throughout the several views of the drawings.

DETAILED DESCRIPTION

Figure 1:
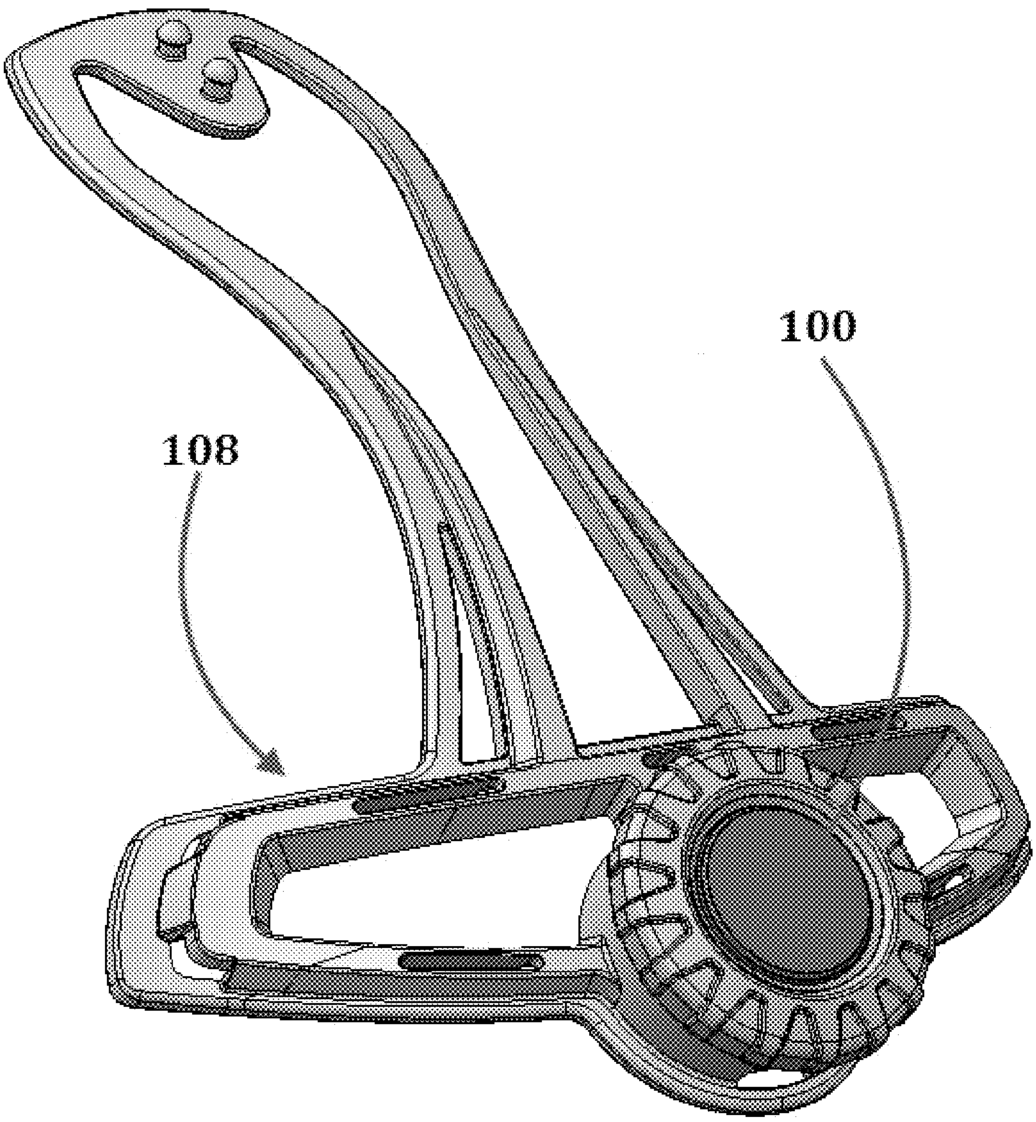
FIG. 1 is a perspective view of a dial drive fit system removably attached to a yoke, according to one embodiment.

Referring to the several views of the drawings, the dial drive fit system 100 is shown and described herein.

The dial drive system 100 is a device intended to be mounted into the fit system of a helmet, boot, knee/arm brace, glove, yoke device mounted into any of these implements, or into an accompanying fit system to allow for fit and comfort adjustments. Similarly, the dial drive system may be applied to any article or material requiring adjustable tightening.

The dial drive system 100 pulls a non-stretching filament 128 inward, coiling it around a spool 130. The tightening of this filament 128 tightens the fit system of the article (e.g., yoke, helmet, boot, knee arm brace, etc.) or tightens other parts of a fit system or tightening system.

According to one embodiment, filament 128 may be a single strand, circular, or larger diameter continuous ring of material starting on one side at the spool 130 and connecting at the other end at the same spool 130. The filament 128 may be made of Kevlar, polyester, polypropylene, nylon, natural fibers, synthetic fibers, metals or metal alloys, and/or a combination of these materials. The filament 128 may be coiled around the spool 130 when the spool 130 is rotated clockwise or counterclockwise. If rotating clockwise to tighten or shorten the filament 128, then rotating in a counterclockwise rotational direction will lengthen or loosen the filament 128. The opposite is also true-if tightening by rotating counterclockwise, then clockwise rotation will loosen the filament 128 around the spool 130. The determination of tightening or loosening can only occur when filament 128 is fully extended to its maximum length, or largest diameter of the ring, thus allowing a user to choose the rotational direction to begin tightening of the filament 128 around the spool 130.

In one embodiment, the two ends of the filament 128 are fastened to opposing sides of the smallest diameter of the spool 130. In use, the filament 128 could weave through other components of the helmet, garment, or fit solution and tighten or loosen the system or product.

The spool 130 is operationally rotated by a dial base axle 116 and/or by a dial base 104 that may be separably attached to or may be integrally formed with the spool 130 or may be separably attached to the spool 130.

Figure 3:
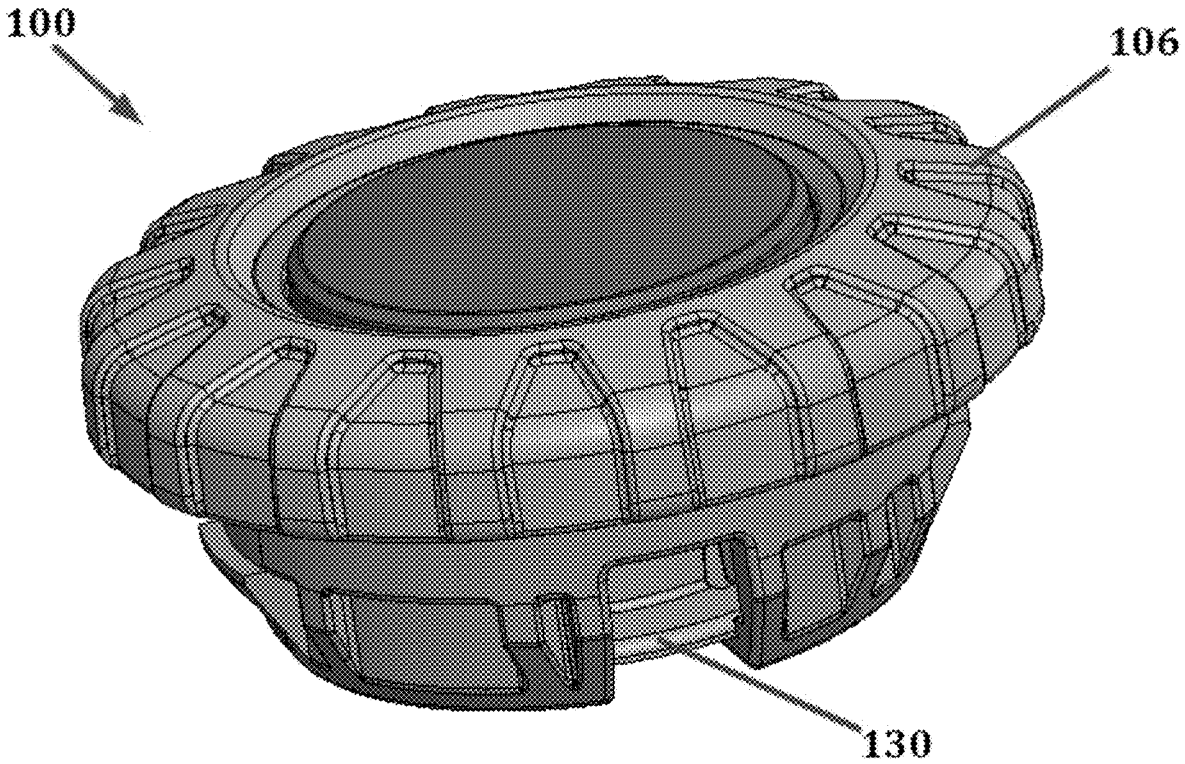
FIG. 3 is a perspective view of a dial drive fit system, according to one embodiment.
Figure 4:
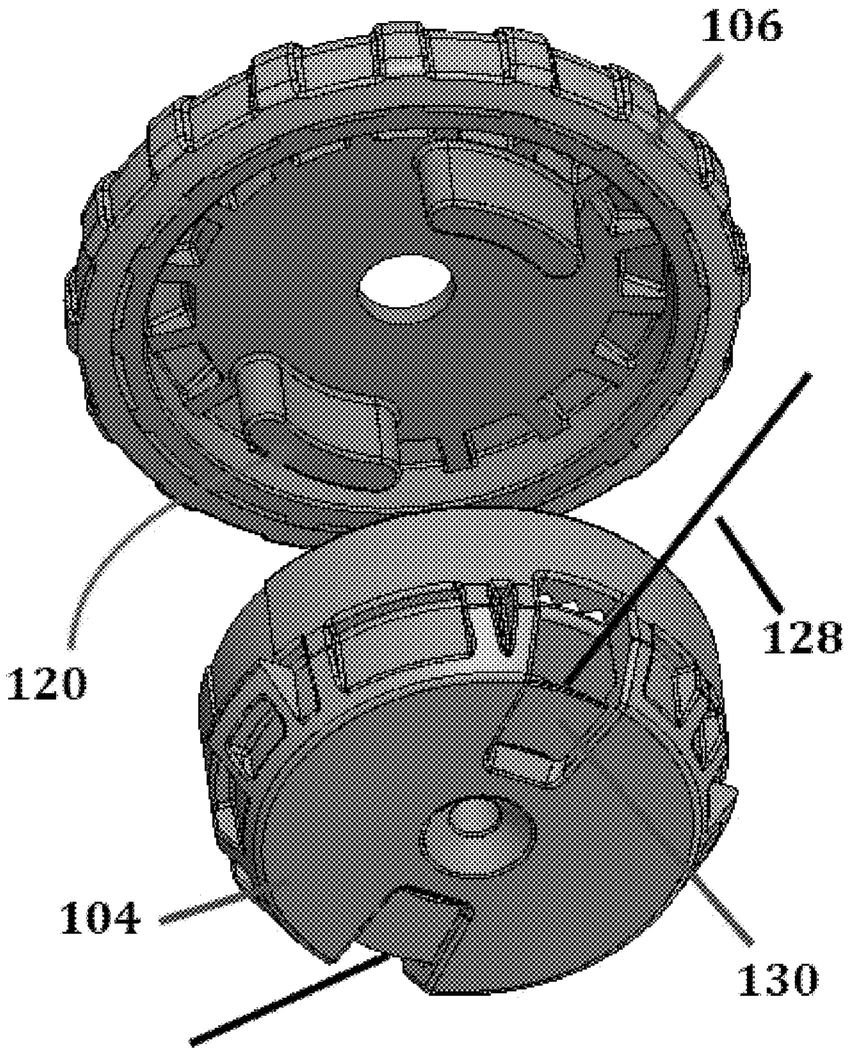
FIG. 4 is an underside perspective view of a dial drive fit system, including a dial handle and a dial base, according to one embodiment.

Referring now to FIGS. 3-4, the dial member 102 of the dial handle 106 includes a lower surface that contains at least one dial arm 120 integrally formed with the dial handle 106. A user may grip the dial handle 106 to rotate the dial handle 106 clockwise or counterclockwise, whereby the rotation of the dial handle 106 drives the rotation of the spool 130, winding or unwinding the filament 128 from the spool 130. When the dial handle 106 is not forcibly rotated, the spool 130 is prevented from rotation, thus preventing the filament 128 from winding or unwinding around the spool 130.

When the dial handle 106 is rotated clockwise or counterclockwise, the dial 102 is turned in sync with the dial handle 106. The force is transferred from the clicker arm 112 to the dial base axle 116. The dial base axle 116 is connected to or integrated with the spool 130, such that when the dial base axle 116 is rotated, the spool 130 is rotated, thus winding a filament 128 around the spool 130 or unwinding the filament 128 from the spool 130, depending on the rotational direction.

Figure 2:
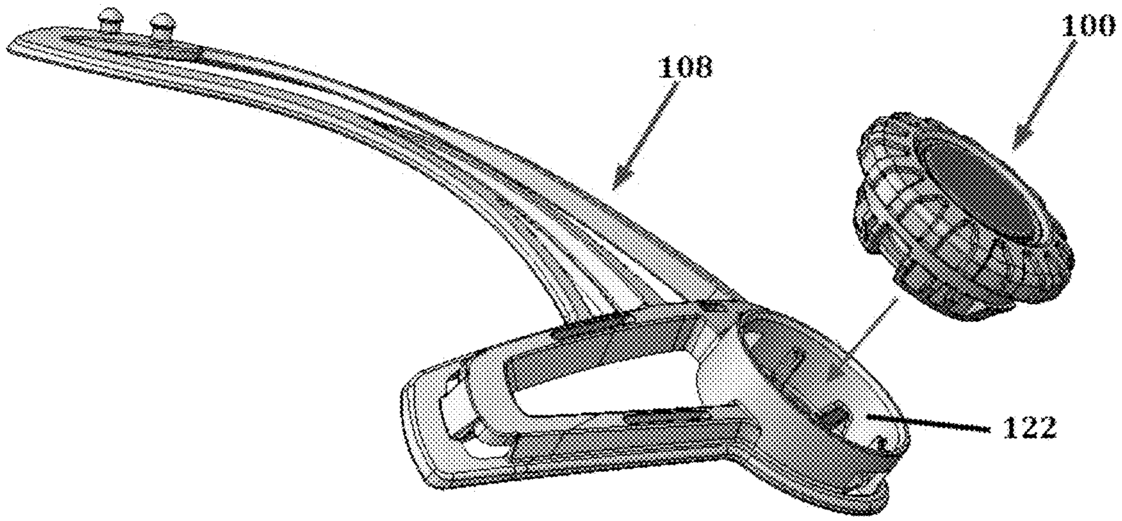
FIG. 2 is a perspective view of a dial drive fit system and a yoke, according to one embodiment.

According to one embodiment, and as shown in FIGS. 1 and 2, the dial drive fit system 100 may be mounted on a yoke 108. The yoke 108 holds the dial drive fit system 100 in position on the relevant item or material to be tightened/secured by the dial drive fit system. For example, in the context of a helmet fit system, the yoke 108 connects the filament 128 of the dial drive fit system 100 to the helmet.

It will be appreciated by one of ordinary skill in the art that the yoke 108 may take on different configurations depending on the product with which it is being used. For example, the yoke 108 for a helmet would be different in shape and size than a yoke 108 for a glove. The yoke 108 can also be referred to as a primary housing of the dial drive fit system 100. In one embodiment, the yoke 108 includes one or more filament guides for facilitating the threading of the filament 128 throughout the helmet or other apparatus to which the dial drive fit system 100 is functionally attached.

According to one embodiment, the yoke 108 may include a drive mount 122 that is integrally formed with the yoke 108. The drive mount 122 provides support for the dial drive fit system 100, wherein the dial drive fit system 100 may be fitted to the drive mount 122 via frictional attachment, via releasable tabs, or via similar alternate releasable attachment means.

According to one embodiment, the dial drive fit system 100 facilitates tightening and loosening of a filament 128 around the spool 130. The clicker arms 112 of the clicker assembly 110 may be composed of a flexible material, such as plastic, carbon fiber, metal/metal alloys, or a combination of these or similar materials.

Figure 5:
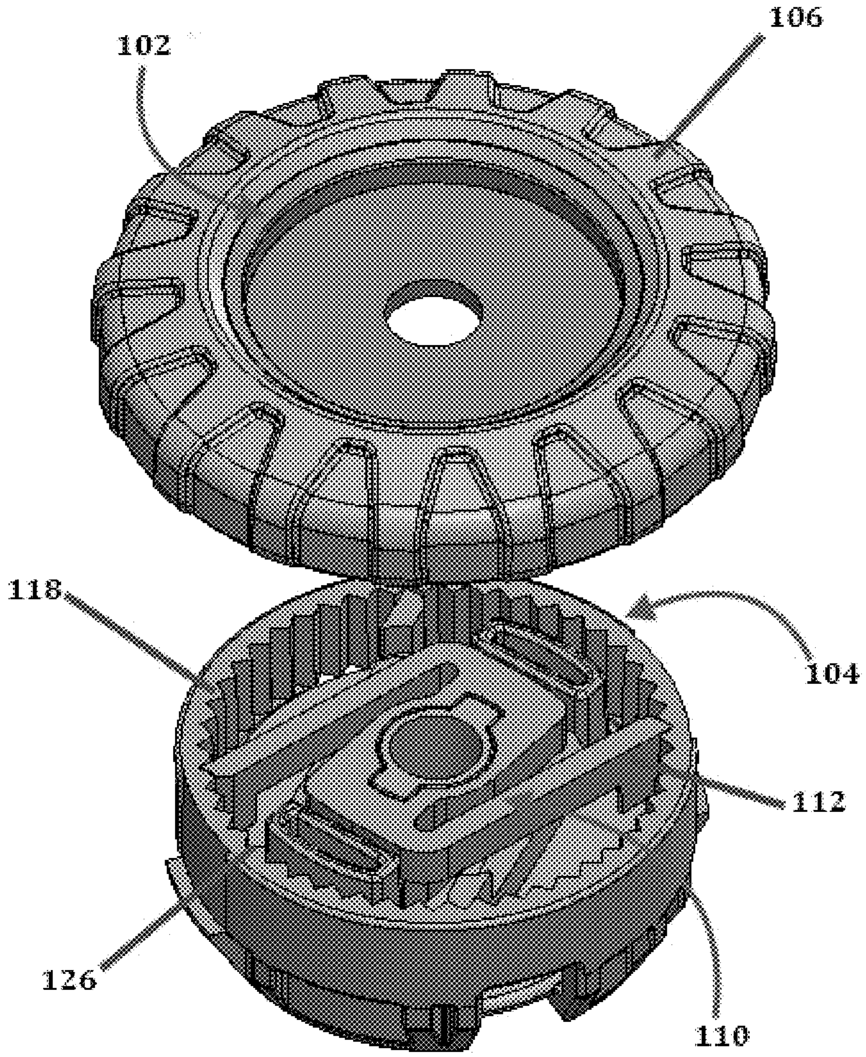
FIG. 5 is a top perspective view of a dial drive fit system, including a dial handle and a dial base, according to one embodiment.
Figure 6:
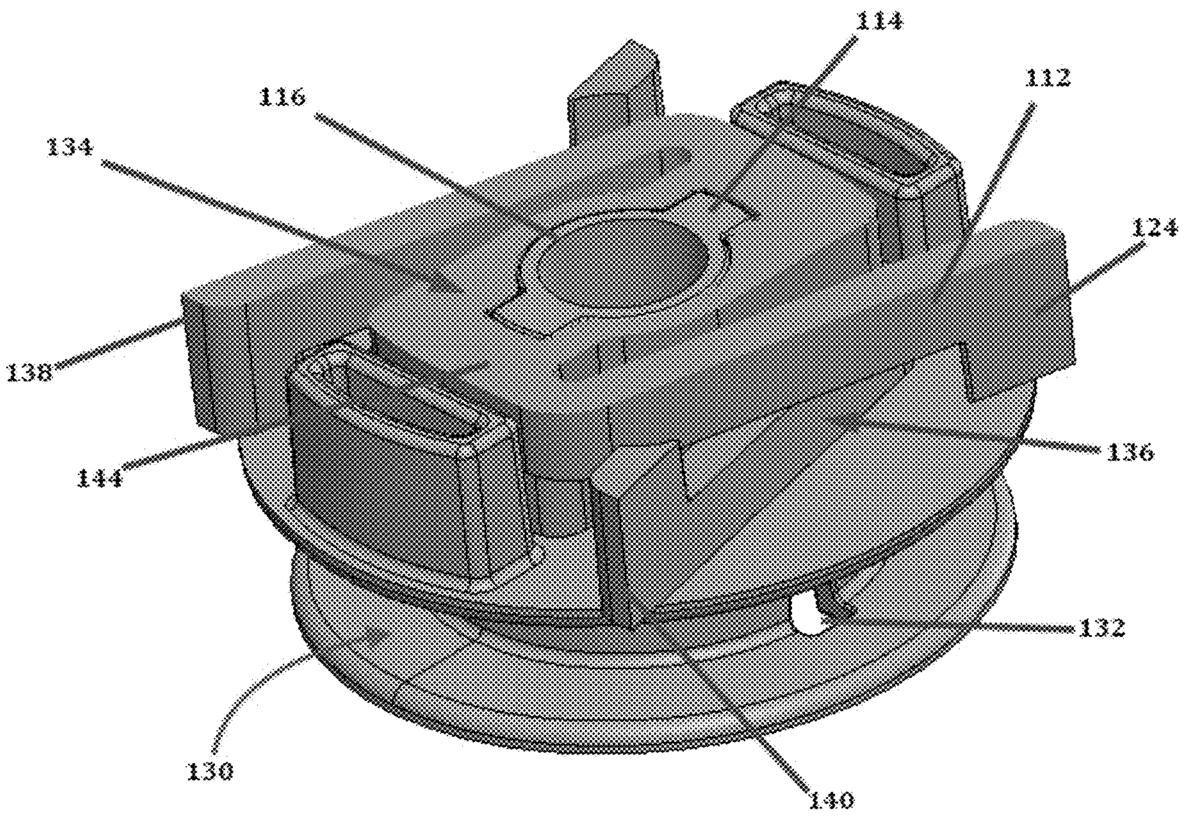
FIG. 6 is an isolated perspective view of a first clicker assembly, second clicker assembly, and a spool of a dial drive fit system, according to one embodiment.
Figure 7:
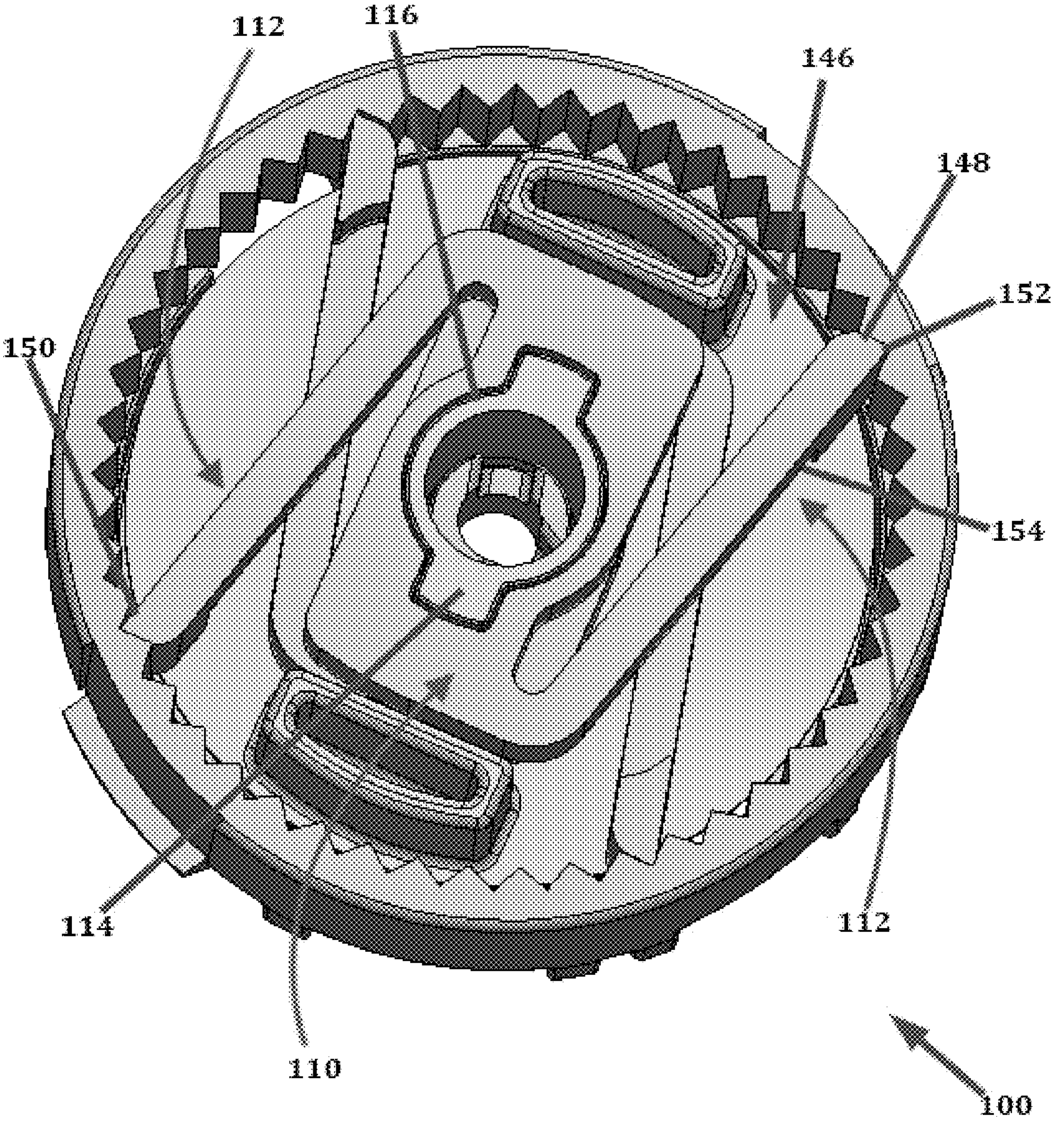
FIG. 7 is a top view of an upper clicker assembly, lower clicker assembly, and a spool of a dial drive fit system, according to one embodiment.

Referring now to FIGS. 5-7, and according to one embodiment, in a stationary state of the dial drive fit system 100, each of the clicker arm tines 124 are secured in a dial base slot 126 located between two dial base teeth 118. In the stationary state, the clicker arms 112 are not flexibly deformed, and accordingly, spool 130 rotation is prevented and the filament 128 remains at a fixed length extended from the spool 130. For example, in the stationary state, if an external tensional force is applied to the filament 128 in a direction away from the spool 130, the clicker arms 112 prevent the spool 130 from rotation, thus preventing the filament 128 from being unwound.

The clicker arms 112 may be substantially linear and may extend from the clicker assembly base 144 at a clicker arm angle 146. The clicker arm tines 124 may include a sloped tine surface 148 on the terminal end of the clicker arm 112 at the opposite end of the attachment location between the clicker arm 112 and the clicker assembly base 144.

The sloped tine surface 148 of the first clicker set 134 may be complementary to the sloped tine surface 148 of the second clicker set 136. For example, and as shown in FIGS. 6 and 7, in the first clicker set 134, the sloped tine surface 148 is located on the interior side of the clicker arm 112. Similarly, in the second clicker set 136, the sloped tine surface is located on the interior side of the clicker arm 112.

The clicker arms 112 may also contain a non-sloped tine surface 150 located at a side of the clicker arm 112 opposite to the sloped tine surface 148. The non-sloped tine surface 150 may be at an angle substantially parallel to that of the longitudinal length of the clicker arm 112, and the non-sloped tine surface 150 may be an extension of the clicker arm exterior surface 154 and/or parallel to the clicker arm exterior surface 154.

The intersection of the sloped tine surface 148 and the non-sloped tine surface 150 create a tine point 152. According to one embodiment, the first clicker arm tines 138 are engaged with the dial base teeth 118 and dial base slot 126 such that the first clicker arm tines 138 prevent counter-clockwise rotation of the spool 130. Specifically, the clicker arms 112 of the first clicker set 134 are sufficiently rigid such that when the spool is rotated where, for example, tension is applied to a filament 128 coiled around the spool 130, the rigid clicker arms 112 of the first clicker set 134 prevent rotation of the spool 130. The clicker arm sets 134 are locked to the spool 130 by bosses 114 on axle 116.

When the sloped tine surface 148 is in contact with a dial base tooth 118 and seated in a dial base slot 126, the force is transmitted longitudinally along the length of clicker arm 112, whereby the clicker arm 112 is prevented from deforming laterally (i.e., non-parallel to the length of the clicker arm 112). For example, if a rotational force is applied to the spool 130 exclusively via tension on the filament 128 (e.g., a pulling force applied to the filament 128), the clicker arm 112 is prevented from deformation, thus inhibiting the rotation of the spool 130 and preventing the filament 128 from unspooling from the spool 130.

In contrast, when the non-sloped tine surface 150 is in forcible contact with a dial base tooth 118, the force is transmitted substantially perpendicular to the length of the clicker arm 112, thus deforming the clicker arm 112 and allowing rotation of a clicker assembly 110. Because of the complementary arrangement of the sloped tine surfaces 148 and non-sloped tine surfaces 150 of the first clicker set 134 and the second clicker set 136, in the stationary state, there will always be at least one sloped tine surface 148 in contact with at least one dial base tooth 118, preventing rotation of the first clicker set 134 and second clicker set 136, thereby preventing rotation of the spool 130.

When a user rotates the dial handle 106, the dial handle 106 rotates the dial arms 120. The rotation of the dial arms 120 places them into contact against the clicker arms 112 of either the first clicker set 134 or the second clicker set 136. When the user applies a sufficient rotational force, the dial arms 120 cause the respective clicker arms 112 to flexibly deform, thus disengaging the respective clicker arm tines 124 from the dial base slots 126.

Referring now to FIGS. 4-5, and according to one embodiment, when the dial member 102 is rotated clockwise, the dial arms 120 are brought into contact with the clicker arms 112 of second clicker set 136. Upon sufficient application of force, the dial arms 120 deform each clicker arm 112 of second clicker set 136, thus removing the second clicker arm tines 140 from contact with the dial base teeth 118 and dial base slot 126 and permitting the clicker assembly 110 to rotate the dial base axle 116. The dial base axle 116, in turn, rotates the spool 130 clockwise, thus permitting winding/unwinding of the filament 128 from the spool 130.

During such clockwise rotation, the dial arms 120 are not in contact with the first clicker set 134, and accordingly, the dial arms 120 do not apply a deformation force to the clicker arms 112 of the first clicker set 134. Instead, as the dial base 104 is rotated in a clockwise direction, the dial base teeth 118 apply force against the non-sloped tine surface 150 of the first clicker arm tines 138, deforming these clicker arms 112 and permitting them to rotate clockwise to the next sequential dial base tooth 118 and dial base slot 126, and in turn, rotate the dial base axle 116 to drive rotation of the spool 130.

Once rotation of the dial handle 106 has ceased, the dial arms 120 disengage from the clicker arms 112; the clicker arms 112 return to the non-deformed state, placing the second clicker arm tines 140 into contact with the dial base teeth 118. Both the second clicker arm tines 140 and the first clicker arm tines 138 are in contact with the dial base teeth 118 and are seated in a dial base slot 126, preventing rotation the spool 130 absent rotation of the dial handle 106.

Referring now to FIG. 4-5, and according to one embodiment, when the dial handle 106 is rotated counterclockwise, the dial arms 120 are brought into contact with the clicker arms of the first clicker set 134. Upon sufficient application of force, the dial arms 120 deform each clicker arm 112 of the first clicker set 134, thus removing the first clicker arm tines 138 from contact with the dial base teeth 118 and dial base slot 126 and permitting the clicker assembly 110 to rotate the dial base axle 116. The dial base axle 116, in turn, rotates the spool 130 counterclockwise, thus permitting the winding/unwinding of the filament 128 from the spool 130.

During such counterclockwise rotation, the dial arms 120 are not in contact with the second clicker set 136, and accordingly, the dial arms 120 do not apply a deformation force to the clicker arms 112 of the second clicker set 136. Instead, as the dial base 104 is rotated in a counterclockwise direction, the dial base teeth 118 apply force against the non-sloped tine surface 150 of the second clicker arm tines 140, deforming these clicker arms 112 and permitting them to rotate counterclockwise to the next sequential dial base tooth 118 and dial base slot 126, and in turn, rotate the dial base axle 116 to drive rotation of the spool 130.

Once rotation of the dial handle 106 has ceased, the dial arms 120 disengage from the clicker arms 112; the clicker arms 112 return to the non-deformed state, placing the first clicker arm tines 138 into contact with the dial base teeth 118. Both the first clicker arm tines 138 and the second clicker arm tines 140 are in contact with the dial base teeth 118 and are seated in a dial base slot 126, preventing rotation of the spool 130 absent rotation of the dial handle 106.

Figure 8:
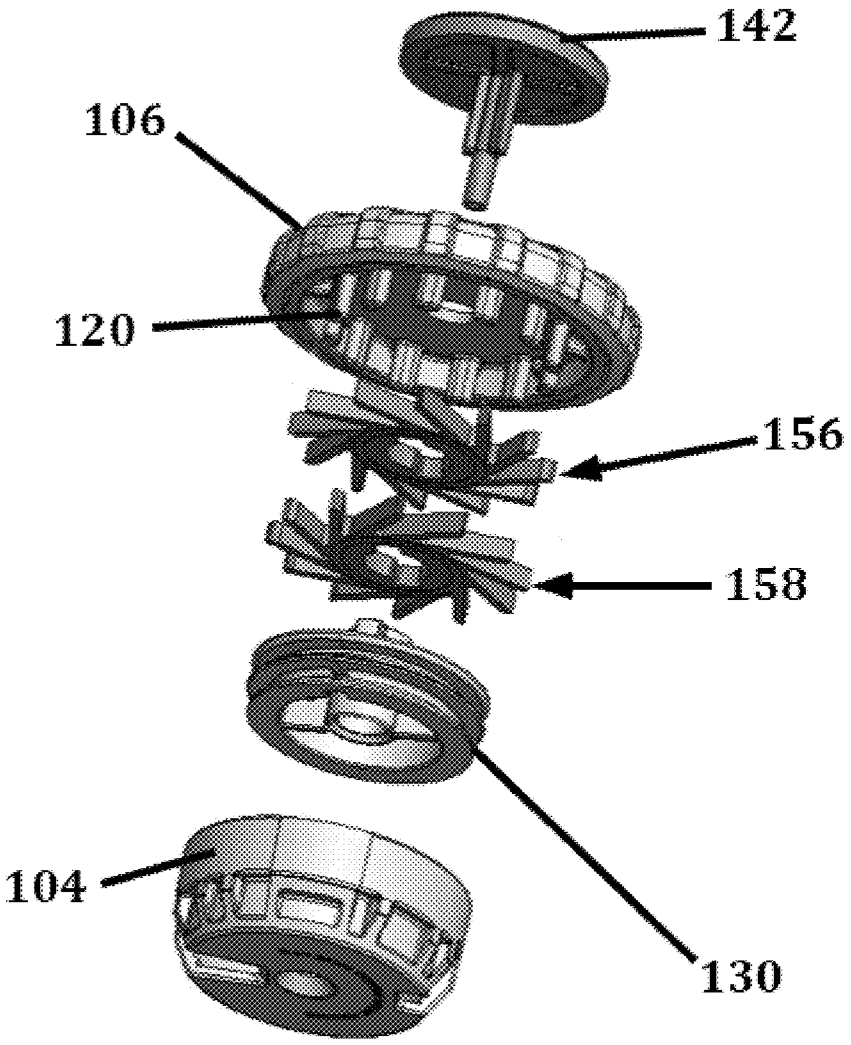
FIG. 8 is a side perspective view of a dial drive fit system, including a dial handle and a dial base, according to one embodiment.
Figure 9:
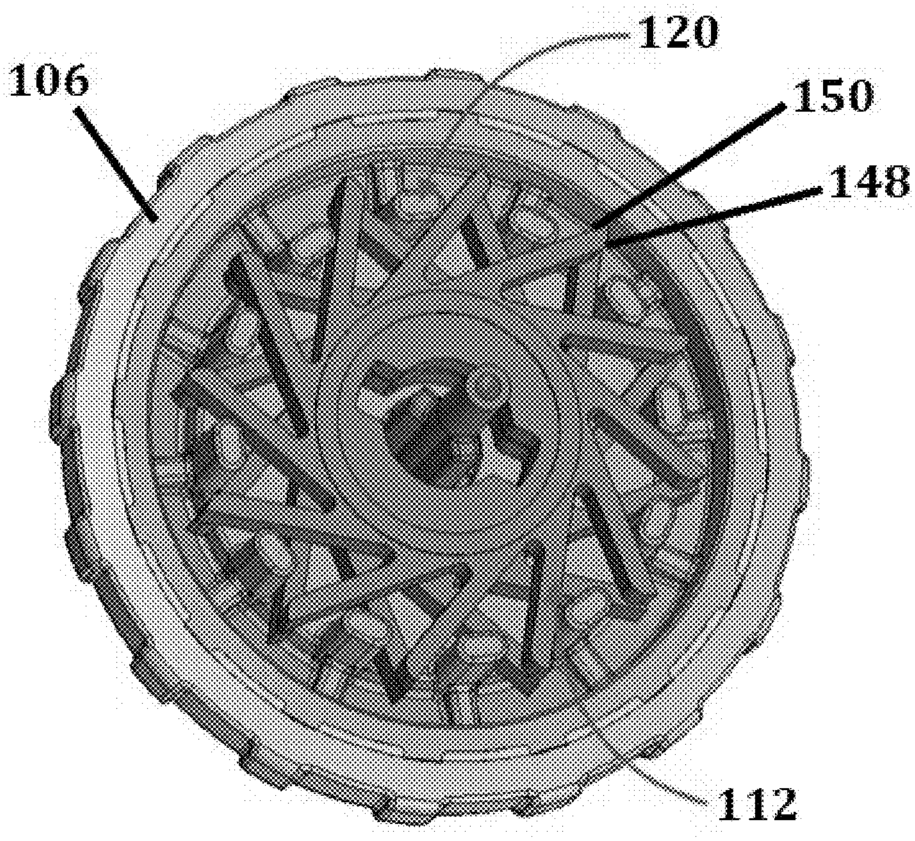
FIG. 9 is a bottom view of a first multi-tooth ring, a second multi-tooth ring, and a dial handle of a dial drive fit system, according to one embodiment.

According to one embodiment, and as shown in FIGS. 8 and 9, the clicker assembly of the dial drive fit system 100 may include a first multi-tooth ring 156 and a second multi-tooth ring 158, wherein, for example, each of the first multi-tooth ring 156 and second multi-tooth ring 158 include twelve clicker arms 112. It will be appreciated by one of ordinary skill in the art that the first multi-tooth ring 156 and the second multi-tooth ring 158 may include alternative pluralities of clicker arms 112 without departing from the spirit and scope of the invention.

Similarly, where the first multi-tooth ring 156 and the second multi-tooth ring 158 include twelve clicker arms 112 (or a similar plurality of clicker arms 112), the dial member 102 may include twelve dial arms 120, where each dial arm 120 is correspondingly capable of engaging with a clicker arm 112 when the dial handle 106 is rotated. Upon rotation of the dial handle 106, when the dial arms 120 engage with the plurality of clicker arms 112, the clicker arms 112 are disengaged from the dial base teeth 118, permitting the dial base axle 116 to rotate the spool 130. Alternatively, the first multi-tooth ring 156 and second multi-tooth ring 158 may include an alternative plurality of respective clicker arms 112, where for example, the dial member 102 may include a matching number of dial arms 120.

Each of the clicker arms 112 of the first multi-tooth ring 156 and the second multi-tooth ring 158 may similarly include a sloped tine surface 148 and a non-sloped tine surface 150.

Figure 10:
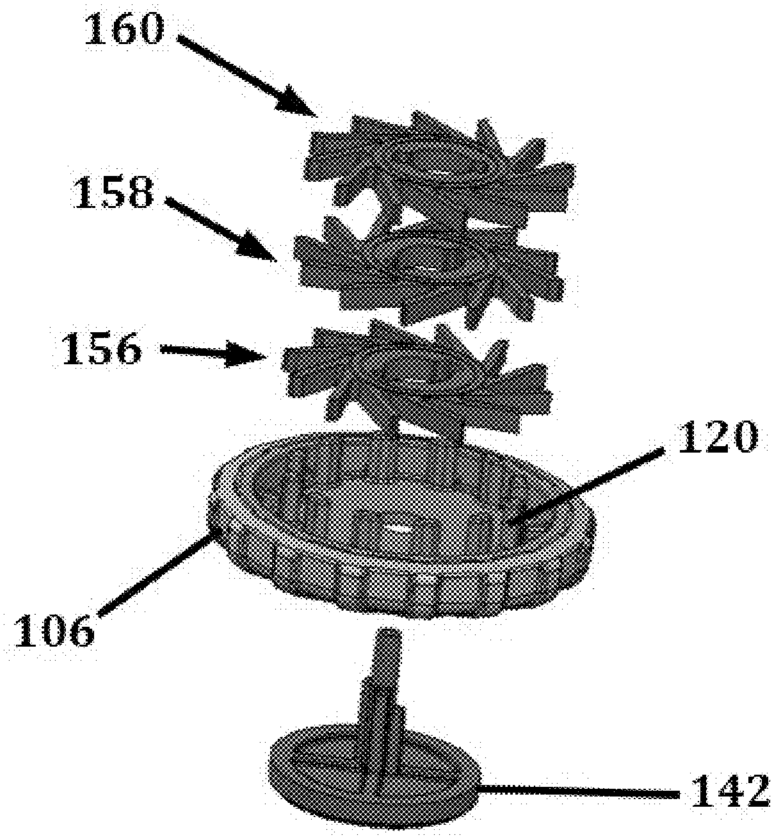
FIG. 10 is an isolated perspective view of a first multi-tooth ring, a second multi-tooth ring, a third multi-tooth ring, and a dial handle of a dial drive fit system, according to one embodiment.
Figure 11:
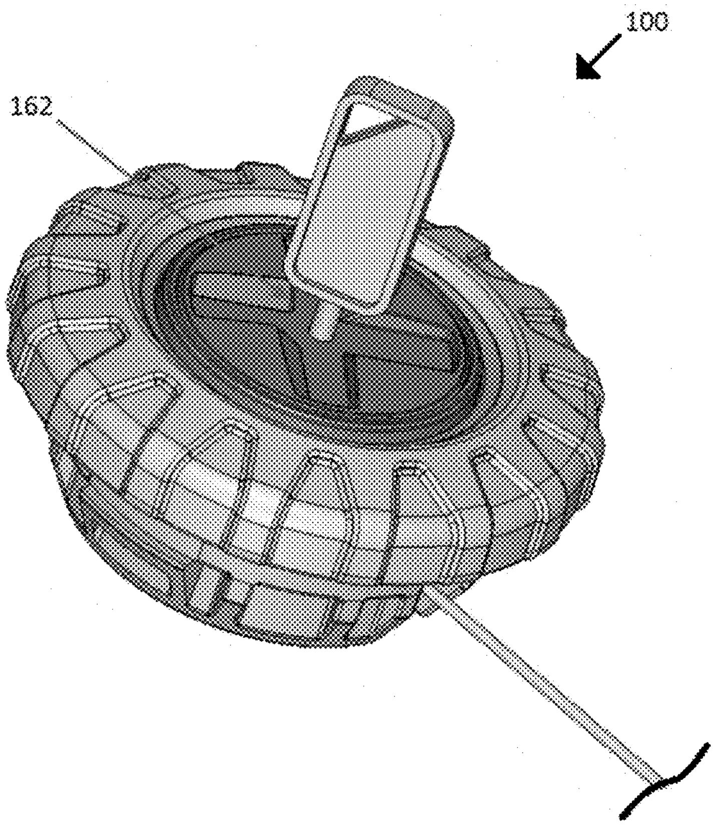
FIG. 11 is a perspective view of a dial drive fit system according to one embodiment.
Figure 12:
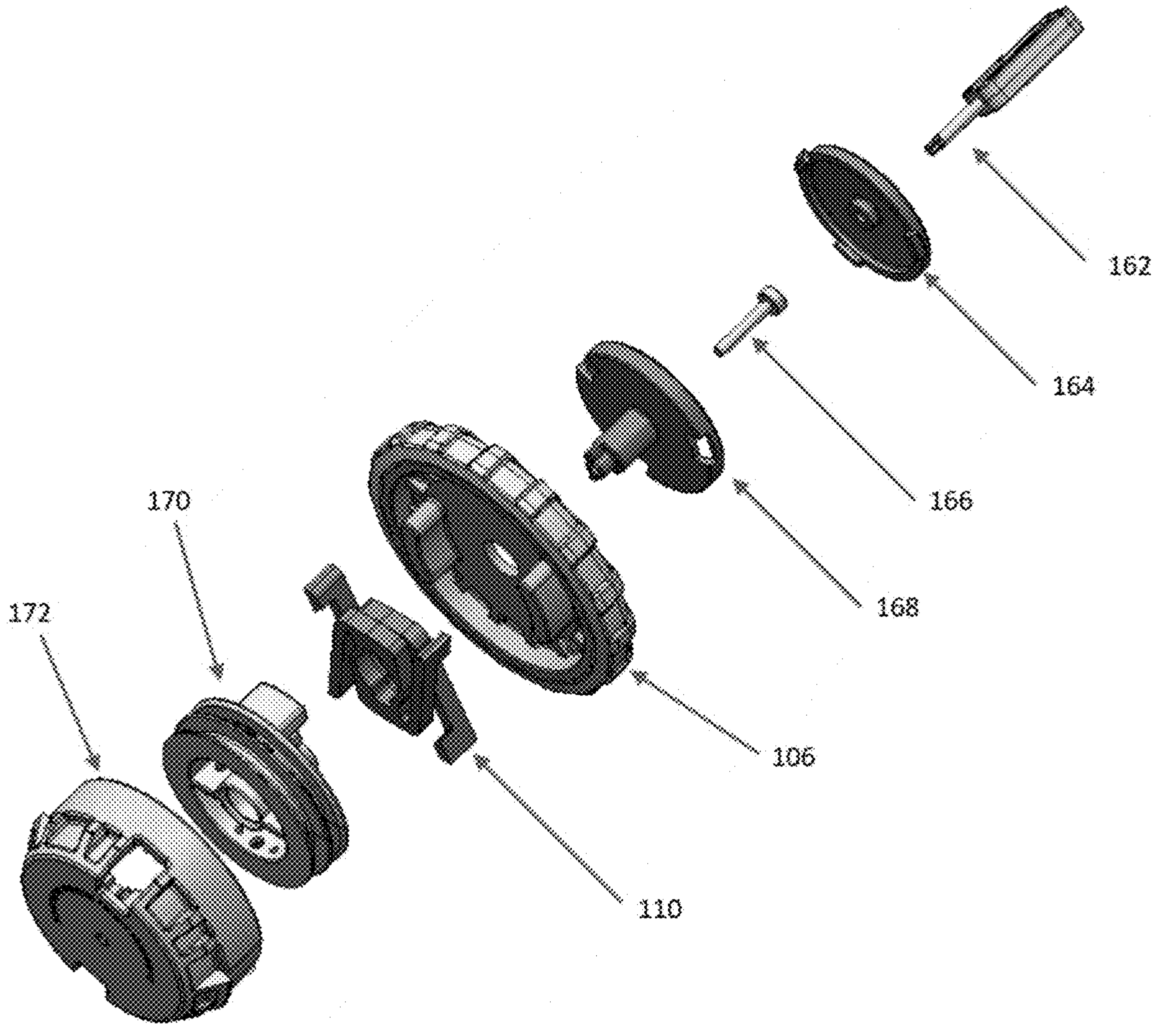
FIG. 12 is an exploded view thereof.
Figure 13:
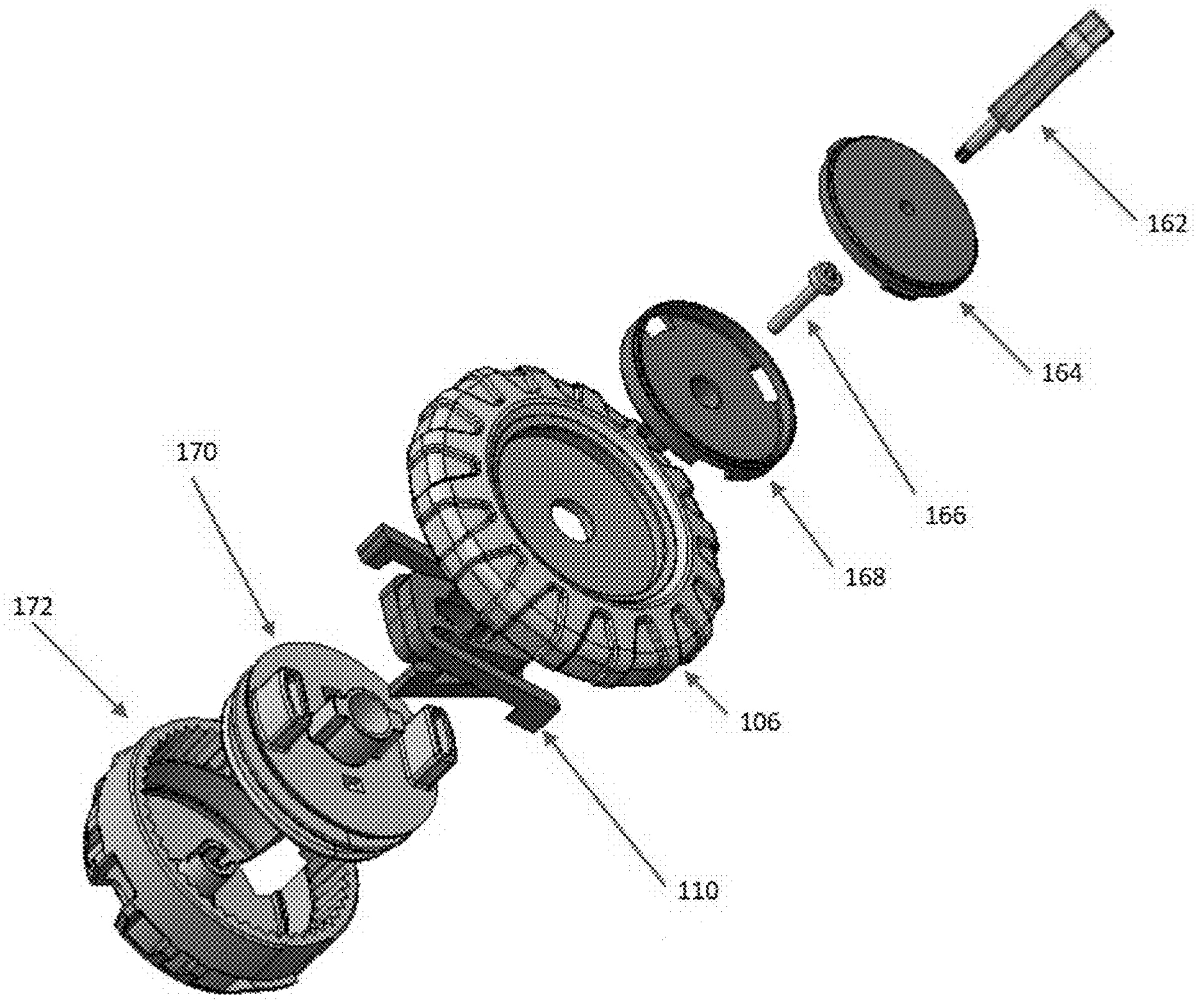
FIG. 13 is an exploded view thereof.
Figure 14:
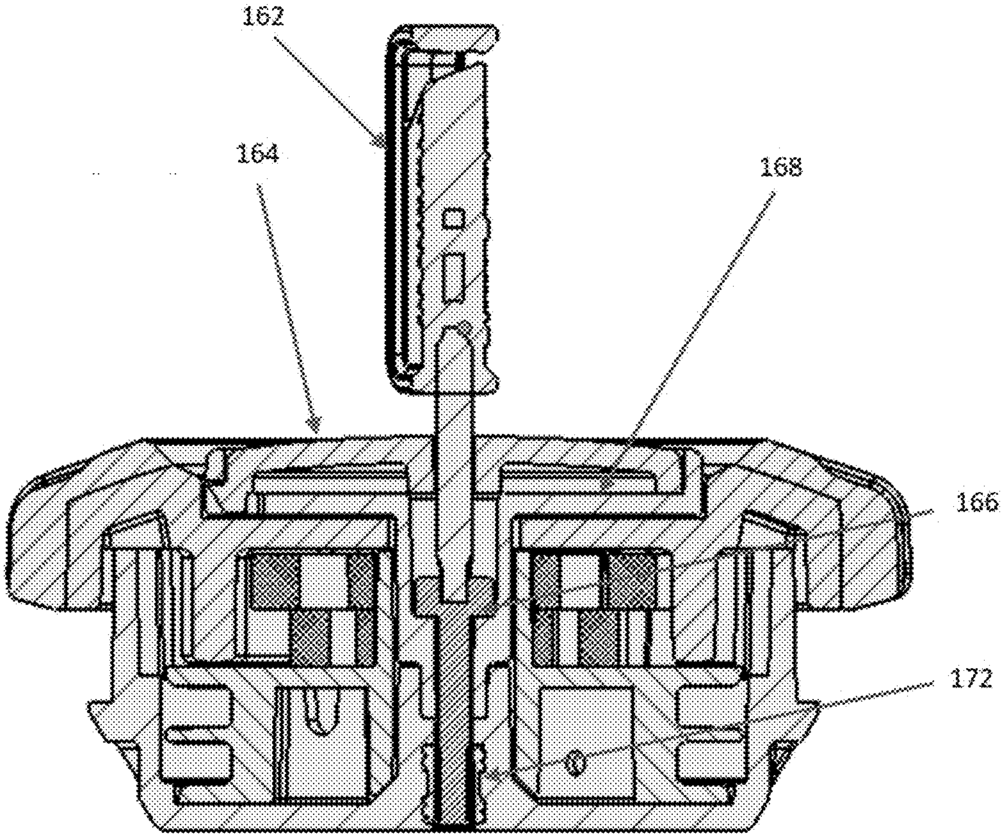
FIG. 14 is a cross sectional view thereof.

According to one embodiment, and as shown in FIG. 10, the dial drive fit system 100 may include a first multi-tooth ring 156, a second multi-tooth ring 158, and a third multi-tooth ring 160, wherein the first multi-tooth ring 156 and the third multi-tooth ring 160 include clicker arms 112 that are in substantially identical orientation. The inclusion of the third multi-tooth ring 160 in addition to the first multi-tooth ring 156 and the second multi-tooth ring 158 may impart additional strength in preventing unwanted rotation of the spool 130, for example, when tension is applied to the filament 128. It will be appreciated by one of ordinary skill in the art that additional multi-tooth rings may be included beyond the third multi-tooth ring 160 without departing from the spirit and scope of the invention, where the inclusion of such additional multi-tooth rings may impart additional strength in preventing unwanted rotation of the spool 130. Each additional multi-tooth ring may include a clicker arm 112 orientation that is configured in an inverted orientation from the adjacent multi-tooth rings. For example, and as shown in FIG. 10, the first multi-tooth ring 156 and the second multi-tooth ring 158 feature an inverted orientation from one another, and the second multi-tooth ring 158 and the third multi-tooth ring 160 feature an inverted orientation from one another.

With reference to FIGS. 11-16, in one embodiment, the dial drive system 100 is serviceable. A torx wrench 162 is provided for selectively accessing the inner cavity of the dial drive system 100. The dial drive system 100 further includes a cap 164, a screw 166, a cap holder 168, the dial 106, the clicker assembly 110, a spool 170, and a base 172 having a molded threading 174 for mating with screw 166. When tightened, the screw 166 holds the cap holder 168, dial 106, clicker assembly 110, spool 170 and base 172 securely together.

Figure 15:
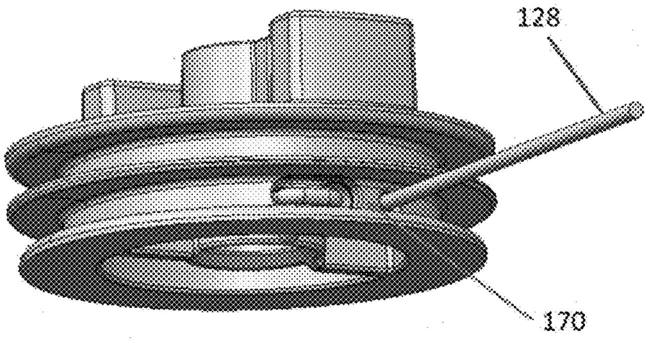
FIG. 15 is an isolated perspective view of the cable and spool.
Figure 16:
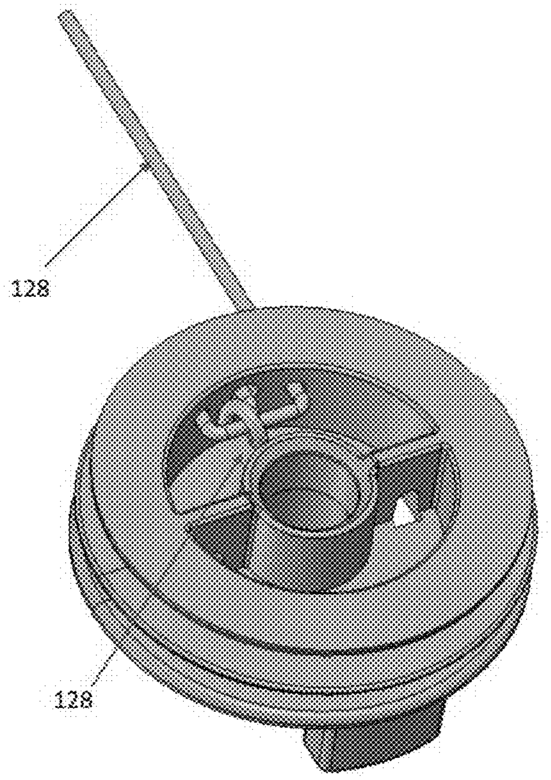
FIG. 16 is an isolated perspective view of the cable and spool.

Referring now to FIGS. 15-16, the cable 128 can be serviced by threading it through the three apertures on the spool 170, binding the cable 128.

While the present invention has been shown and described in accordance with several preferred and practical embodiments, it is recognized that departures from the instant disclosure are contemplated within the spirit and scope of the present invention.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The term "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms “a,” “an,” and “the” are intended to include the plural forms as well, unless expressly stated otherwise or the context indicates otherwise.

It will be further understood that the terms “includes,” “comprises,” “including,” and/or “comprising” specify the presence of stated features, steps, operations, elements, and/or components, but do not preclude the presence or addition of one or more other features, steps, operations, elements, components, and/or groups thereof unless explicitly stated otherwise or the context clearly requires otherwise. The terms “includes,” “has” or “having” or variations in form thereof are intended to be inclusive in a manner similar to the term “comprises” as that term is interpreted when employed as a transitional word in a claim.

It will be understood that when a component is referred to as being “connected” or “coupled” to another component, it can be directly connected or coupled or coupled by one or more intervening components unless expressly stated otherwise or the context clearly indicates otherwise.

The term “and/or” includes any and all combinations of one or more of the associated listed items. As used herein, phrases such as “between X and Y” and “between about X and Y” should be interpreted to include X and Y unless expressly stated otherwise or the context clearly indicates otherwise.

Terms such as “about”, “approximately”, and “substantially” are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of “approximately X inches” is recited, a lower or higher height is still “approximately X inches” if the desired function can still be performed or the desired result can still be achieved.

While the terms vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, “can”, “could”, “might”, or “may”, unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step may not be required for every implementation or embodiment.

The subject matter described herein is provided by way of illustration only and should not be construed as limiting the nature and scope of the subject invention. While examples of aspects of the subject invention have been provided above, it is not possible to describe every conceivable combination of components or methodologies for implementing the subject invention, and one of ordinary skill in the art may recognize that further combinations and permutations of the subject invention are possible. Furthermore, the subject invention is not necessarily limited to implementations that solve any or all disadvantages which may have been noted in any part of this disclosure. Various modifications and changes may be made to the subject invention described herein without following, or departing from the spirit and scope of, the exemplary embodiments and applications illustrated and described herein. Although the subject matter presented herein has been described in language specific to components used therein, it is to be understood that the subject invention is not necessarily limited to the specific components or characteristics thereof described herein; rather, the specific components and characteristics thereof are disclosed as example forms of implementing the subject invention. Accordingly, the disclosed subject matter is intended to embrace all alterations, modifications, and variations, that fall within the scope and spirit of any claims that are written, or may be written, for the subject invention.

What is claimed is:

1. A dial drive system comprising:

a dial including an upper surface and a lower surface, wherein a plurality of dial arms is located on the lower surface;

a dial base and a spool, the spool being rotatably mounted to the dial base and configured to receive a filament to be tightened around the spool;

a plurality of dial base teeth located on an interior surface of the dial base, wherein a dial base slot is positioned between adjacent ones of the plurality of dial base teeth;

a clicker assembly including a first plurality of clicker arms having a first orientation and stacked a second plurality of clicker arms having a second orientation;

the first and second pluralities of clicker arms each including at least one clicker arm tine, wherein each of the clicker arm tines forms a tine point including a sloped tine surface and a non-sloped tine surface;

the first plurality of clicker arms and the second plurality of clicker arms each being sized and configured to deform when the non-sloped tine surface is forcibly contacted by one of the plurality of dial arms;

wherein rotation of the dial in a first direction causes each of the plurality of dial arms to engage with and deform a corresponding one of the first plurality of clicker arms, disengaging the sloped tine surface of the clicker arm tines of the first plurality of clicker arms from the dial base and rotating the spool in the first direction to first wind the filament around the spool; and wherein subsequent rotation of the dial in a second direction causes each of the plurality of dial arms to engage with and deform a corresponding one of the second plurality of clicker arms, disengaging the sloped tine surface of the clicker arm tines of the second plurality of clicker arms from the dial base and rotating the spool in the second direction to first unwind the filament from around the spool.

2. The dial drive system as recited in claim 1 wherein the clicker assembly comprises a first clicker set and a second clicker set, each of the clicker sets having at least one of the first plurality of clicker arms and at least one of the second plurality of clicker arms.

3. The dial drive system as recited in claim 1 wherein the clicker assembly comprises first and second multi-tooth rings, the first multi-tooth ring having the first plurality of clicker arms and the second multi-tooth ring having the second plurality of clicker arms.

4. The dial drive system as recited in claim 1 wherein the clicker assembly is selectively and removably attachable to the dial base.

5. The dial drive system as recited in claim 1 further comprising a dial handle connected to the dial.

6. The dial drive system as recited in claim 5 wherein each of the dial arms of the plurality of dial arms is integrally formed with the dial handle.

7. The dial drive system as recited in claim 1 wherein:

after rotation of the dial in the second direction has caused the filament to be unwound from around the spool then further rotation of the dial in the second direction causes each of the plurality of dial arms to engage with and deform a corresponding one of the second plurality of clicker arms, disengaging the sloped tine surface of the clicker arm tines of the second plurality of clicker arms from the dial base and rotating the spool in the second direction to wind the filament around the spool; and subsequent rotation of the dial in the first direction then causes each of the plurality of dial arms to engage with and deform a corresponding one of the first plurality of clicker arms, disengaging the sloped tine surface of the clicker arm tines of the first plurality of clicker arms from the dial base and rotating the spool in the first direction to unwind the filament from around the spool.

8. A dial drive system comprising:

a dial including an upper surface and a lower surface, wherein a plurality of dial arms is located on the lower surface;

a dial base and a spool, the spool being rotatably mounted to the dial base and configured to receive a filament to be tightened around the spool;

a plurality of dial base teeth located on an interior surface of the dial base, wherein a dial base slot is positioned between adjacent ones of the plurality of dial base teeth;

a clicker assembly including a first clicker set and a second, stacked, clicker set;

the first clicker set and the second clicker set each forming a first clicker arm and a second clicker arm;

the first and second clicker arms of the first clicker set and the first and second clicker arms of the second clicker set each including at least one clicker arm tine, wherein each of the clicker arm tines forms a tine point including a sloped tine surface and a non-sloped tine surface;

the first and second clicker arms of the first clicker set and the first and second clicker arms of the second clicker set each being sized and configured to deform when the non-sloped tine surface is forcibly contacted by one of the plurality of dial base teeth;

the first and second clicker arms of the first clicker set each having a first orientation, and the first and second clicker arms of the second clicker set each having a second orientation;

wherein rotation of the dial in a first direction causes each of the plurality of dial arms to engage with and deform a corresponding one of the first and second clicker arms of the first clicker set, disengaging the sloped tine surface of the clicker arm tines of the first clicker set from the dial base and rotating the spool in the first direction and to first wind the filament around the spool; and wherein subsequent rotation of the dial in a second direction causes each of the plurality of dial arms to engage with and deform a corresponding one of the first and second clicker arms of the second clicker set, disengaging the sloped tine surface of the clicker arm tines of the second clicker set from the dial base and rotating the spool in the second direction and to first unwind the filament from around the spool.

9. The dial drive system as recited in claim 8 wherein the clicker assembly is selectively and removably attachable to the dial base.

10. The dial drive system as recited in claim 8 further comprising a dial handle connected to the dial.

11. The dial drive system as recited in claim 10 wherein each of the plurality of dial arms is integrally formed with the dial handle.

12. The dial drive system as recited in claim 11 wherein the dial base is circular.

13. The dial drive system as recited in claim 8 wherein:

after rotation of the dial in the second direction has caused the filament to be unwound from around the spool then further rotation of the dial in the second direction causes each of the plurality of dial arms to engage with and deform a corresponding one of the first and second clicker arms of the second clicker set, disengaging the sloped tine surface of the clicker arm tines of the second clicker set from the dial base and rotating the spool in the second direction to wind the filament on the spool; and subsequent rotation of the dial in the first direction then causes each of the plurality of dial arms to engage with and deform a corresponding one of the first and second clicker arms of the first clicker set, disengaging the sloped tine surface of the clicker arm tines of the first clicker set from the dial base and rotating the spool in the first direction to unwind the filament from around the spool.

14. A dial drive system comprising:

a dial including an upper surface and a lower surface, wherein a plurality of dial arms is located on the lower surface;

a dial base and a spool, the spool being rotatably mounted to the dial base and configured to receive a filament to be tightened around the spool;

a plurality of dial base teeth located on an interior surface of the dial base, wherein a dial base slot is positioned between adjacent ones of the plurality of dial base teeth;

a clicker assembly including a first multi-tooth ring and a second multi-tooth ring;

the first multi-tooth ring and the second multi-tooth ring each forming a plurality of clicker arms;

the plurality of clicker arms of the first multi-tooth ring and the plurality of clicker arms of the second multi-tooth ring each including at least one clicker arm tine, wherein each of the clicker arm tines forms a tine point including a sloped tine surface and a non-sloped tine surface;

the plurality of clicker arms of the first multi-tooth ring each having a first orientation and stacked the plurality of clicker arms of the second multi-tooth ring each having a second orientation, each of the clicker arms being sized and configured to deform when the non-sloped tine surface is forcibly contacted by one of the plurality of dial base teeth;

wherein rotation of the dial in a first direction first causes each of the plurality of dial arms to engage with and deform a corresponding one of the plurality of clicker arms of the first multi-tooth ring, disengaging the sloped tine surface of the clicker arm tines of the first multi-tooth ring from the dial base and permitting the dial base to rotate the spool in the first direction to first wind the filament around the spool; and wherein rotation of the dial in a second direction first causes each of the plurality of dial arms to engage with and deform a corresponding one of the plurality of clicker arms of the second multi-tooth ring, disengaging the sloped tine surface of the clicker arm tines of the second multi-tooth ring from the dial base and permitting the dial base to rotate the spool in the second direction to first unwind the filament from around the spool.

15. The dial drive system as recited in claim 14 wherein the clicker assembly further comprises a third multi-tooth ring, the third multi-tooth ring forming a plurality of clicker arms.

16. The dial drive system as recited in claim 14 wherein the clicker assembly is selectively and removably attachable to the dial base.

17. The dial drive system as recited in claim 14 further comprising a dial handle connected to the dial.

18. The dial drive system as recited in claim 17 wherein each of the plurality of dial arms is integrally formed with the dial handle.

19. The dial drive system as recited in claim 14 wherein the dial base is circular.

20. The dial drive system as recited in claim 14 wherein:

after rotation of the dial in the second direction has caused the filament to be unwound from around the spool then further rotation of the dial in the second direction causes each of the plurality of dial arms to engage with and deform a corresponding one of the plurality of clicker arms of the second multi-tooth ring, disengaging the sloped tine surface of the clicker arm tines of the second multi-tooth ring from the dial base and rotating the spool in the second direction to wind the filament on the spool; and subsequent rotation of the dial in the first direction causes each of the plurality of dial arms to engage with and deform a corresponding one of the plurality of clicker arms of the first multi-tooth ring, disengaging the sloped tine surface of the clicker arm tines of the first multi-tooth ring from the dial base and rotating the spool in the first direction to unwind the filament from around the spool.

* * * * *